United States Patent
Mies (10) Patent No.: US 7,114,265 B2
(45) Date of Patent: Oct. 3, 2006

(54) APPARATUS FOR DETECTING THE POSITION OF A PROBE ELEMENT IN A MULTI-COORDINATE MEASURING DEVICE

(75) Inventor: Georg Mies, Wipperfuerth (DE)

(73) Assignee: Klingelnberg GmbH, Hueckeswagen (DE)

( * ) Notice: Subject to any disclaimer, the term of this patent is extended or adjusted under 35 U.S.C. 154(b) by 56 days.

(21) Appl. No.: 10/802,212

(22) Filed: Mar. 17, 2004

(65) Prior Publication Data

US 2004/0231177 A1    Nov. 25, 2004

(30) Foreign Application Priority Data

Mar. 24, 2003   (DE)  ................. 103 13 038

(51) Int. Cl.
G01B 5/004    (2006.01)
G01D 5/347    (2006.01)

(52) U.S. Cl. ................. 33/503; 33/706; 33/1 M; 33/556

(58) Field of Classification Search .......... 33/503, 33/1 M, 556, 558, 706, 707, 708
See application file for complete search history.

(56) References Cited

U.S. PATENT DOCUMENTS

| | | | |
|---|---|---|---|
| 4,166,323 A * | 9/1979 | Maag | 33/501.9 |
| 4,587,622 A | 5/1986 | Herzog | |
| 4,833,630 A | 5/1989 | Braman et al. | |
| 5,061,073 A * | 10/1991 | Michel | 356/619 |
| 5,727,326 A * | 3/1998 | Mies et al. | 33/501.9 |
| 6,082,010 A * | 7/2000 | Lee | 33/1 M |
| 6,351,313 B1 * | 2/2002 | Braasch et al. | 356/616 |
| 6,389,702 B1 * | 5/2002 | Dudley | 33/1 M |
| 6,543,149 B1 * | 4/2003 | Carlisle | 33/503 |
| 6,791,699 B1 * | 9/2004 | Aoki | 356/616 |
| 2004/0246499 A1 * | 12/2004 | Mies | 356/614 |

FOREIGN PATENT DOCUMENTS

| | | |
|---|---|---|
| CH | 674897 A5 | 7/1999 |
| DE | 31 50 977 A1 | 6/1983 |

(Continued)

OTHER PUBLICATIONS

Klingelnberg, "Verzahnungsmesszentren Klingelnberg P 65/ P100", pp. 1-16.

*Primary Examiner*—Diego Gutierrez
*Assistant Examiner*—Amy R. Cohen
(74) *Attorney, Agent, or Firm*—McCormick, Paulding & Huber LLP (57) ABSTRACT

The invention is directed to a device for direct detection of the spatial position of a probe element in a multi-coordinate measuring apparatus, with a reference system comprised of at least one first standard and one second standard that are associated with coordinate axes of the measuring apparatus. The first standard is a planar standard with a line grating array. The second standard is non-contacting relative to the first standard and movable in two dimensions by means of a cross slide. Provision is made for a first position measuring system for determining the spatial position of the second standard with respect to the first standard, and for a second position measuring system for determining the spatial position of a carriage carrying a three-dimensional probe assembly, with respect to the second standard. The device forms in an associated multi-coordinate measuring apparatus a continuous measuring chain from the first standard to the tip of the probe element. This supplies directly a measurement result considering any guide inaccuracies, without the need to perform any path corrections.

15 Claims, 3 Drawing Sheets

FOREIGN PATENT DOCUMENTS

| | | |
|---|---|---|
| DE | 35 26 919 A1 | 1/1986 |
| DE | 41 26 532 A1 | 2/1993 |
| DE | 41 34 371 A1 | 4/1993 |
| DE | 4132942 A1 * | 4/1993 |
| DE | 91 16 843.0 | 4/1994 |
| DE | 43 45 095 C1 | 6/1995 |
| DE | 43 45 094 C2 | 7/1995 |
| DE | 44 09 148 C2 | 9/1995 |
| DE | 199 19 042 A1 | 11/2000 |
| DE | 101 40 174 A1 | 3/2003 |
| EP | 0 464 431 A2 | 1/1992 |
| GB | 2 034 880 A | 6/1980 |
| WO | WO 99/17073 | 4/1999 |

* cited by examiner

APPARATUS FOR DETECTING THE POSITION OF A PROBE ELEMENT IN A MULTI-COORDINATE MEASURING DEVICE

CROSS-REFERENCE TO RELATED APPLICATIONS

This application is entitled to the benefit of and incorporates by reference essential subject matter disclosed in German Patent Application No. 10313038.1 filed on Mar. 24, 2003.

FIELD OF THE INVENTION

The present invention relates generally to a device for detecting the position of a probe element in a multi-coordinate measuring apparatus, and is more particularly directed to such a device having a reference system that includes first and second standards associated with the coordinate axis of the measuring apparatus.

BACKGROUND OF THE INVENTION

A shape measuring machine known from DE 43 45 094 C2 corresponds to a device of the type referred to in the foregoing, which machine includes a reference system of its own for path correction on guideways that is decoupled from the machine's guiding means and control devices and comprises dimensionally accurate elongate standards disposed in parallel alignment to the individual coordinate axes of slidable carriages and adapted to be scanned continuously by parts movable on the guiding means. The reference system is constituted so as to have a geometry which is long-term stable with little sensitivity to temperature. However, the effort involved in order to achieve the requisite measurement accuracy is considerable in this known shape measuring machine, in terms of both apparatus and measurement expenditure. The reference system is comprised of three standards, each formed by profiled rails of rectangular cross-section carrying scanning tracks on two adjacent lateral surfaces. The first standard is mounted on the machine bed. The second standard is attached to the end of a vertical column in addition to having at one end angle brackets embracing the scanning tracks of the first standard, so that the second standard is coupled to the first standard. Correspondingly, the third standard is coupled to the second standard. Provided at each of the two coupling locations between the three standards are several sensors which detect any relative movement between two standards at their coupling location in terms of their position and direction. The detected values are fed to a computing unit calculating therefrom corresponding correction values for the measurement result or for a spatial position of the probe element. This construction aims to enable the known shape measuring machine to exhibit an improved dynamic behavior and reduced non-productive times and durations of measurement as compared with a shape measuring machine with an extremely rigid machine bed, which is frequently manufactured from granite and supports, through a sliding carriage, the vertical column, which in turn is either a solid or heavy cast or steel welded construction.

From DE 31 50 977 A1 methods and a device are known for determining and correcting guide defects of guided machine parts. It includes determining the relevant guide defects of a measuring machine and approximating them by correcting functions stored in the machine's computing unit. The incorrect results of the coordinate measuring device are then corrected in subsequent measurements by means of the correcting functions. A prismatic reference standard that extends parallel to the guide of a carriage carries on a first and on a second surface line gratings, one of which is two-dimensional. A position measuring system serves to determine the spatial position of a support member fixedly connected to the carriage, which support member has reading heads fitted to it and is guided on the reference standard. The reading heads or the support member are placed directly on surfaces of the reference standard. The support member is thus necessarily in touch with the reference standard, which thus forms a mechanical guide, which is always a disadvantage.

From WO 99/17073 a device is known for the detection of six components of the relative motion of two bodies with one primarily two-dimensional translational basic motion. The bodies are formed of a plate provided with a two-dimensional optical grating and of an element having a plane surface parallel to the plate and several optical gratings as reading head. The element is approximated to the plate in such fashion that the optical gratings enable detection of relative displacements, parallel to the plate, in the X and Y directions through an evaluation of the intensity variations of the reflected light. To detect the distance between the element and the plate, provision is made for at least three distance sensing devices which are of the capacitive, inductive or probe type. The device necessitates a planar standard arranged on the one body with a two-dimensional grating, as well as a plane surface provided on the other body and adapted to be aligned parallel to the planar standard.

GB 2 034 880 A discloses an apparatus equally designed in particular to perform linear measurements in two dimensions. In addition, it provides a carriage movable along guide rails in two dimensions over a base. The carriage includes a surface upon which may be placed an object to be measured. The underside of the surface carries a first optical grating comprising parallel lines extending at right angles to one another. A probe is positioned above the surface. Secured to the base under the carriage are two reading heads for detecting movements of the carriage in two vertical directions.

It is an object of the present invention to provide a device of the type initially referred to, which is less complex in terms of construction and measuring engineering.

SUMMARY OF THE INVENTION

The present invention resides in one aspect to a device for the direct detection of a spatial position of a probe element in a multi-coordinate measuring apparatus. The device includes a reference system comprised of at least one first and one second standard, the standards being associated with coordinate axis of the measuring apparatus. The first standard is a planar standard that includes a main surface that carries a line grating array that includes at least one two dimensional line gratings. The second standard is an elongated standard that is non-compacting relative to the first standard and is moveable in two directions and preferably positioned at right angles to the main surface. Provision is made for first position measuring system for determining the spatial position of the second standard with respect to the first standard.

In the device of the present invention, the second standard is movable with respect to the first standard in two dimensions. In contrast to coordinate measuring apparatus using one-dimensional standards, the achieved simplification is significant because the need for a third standard and several sensors is obviated. Because measurement uncertainties occur at each coupling location between the standards, one coupling location less means an increased measuring accuracy of the coordinate measuring apparatus. The mode of operation and the arrangement of the first position measuring system, which determines a spatial position of the second standard with respect to the first standard, are designed so that minor geometric variations in the mechanical construction of the coordinate measuring apparatus do not affect its measuring accuracy. The probe element is preferably associated with a part of the multi-coordinate measuring apparatus whose spatial position with respect to the second standard is detected. The device of the invention thus affords the possibility of forming a continuous measuring chain from the first standard via the second standard to the probe element. Any mechanical forces liable to corrupt the measurement result are not transferred to the standard. Regardless of the mechanical guiding quality and the repeatability of the linear axes of the multi-coordinate measuring apparatus, the device of the invention affords the possibility of achieving a low measurement uncertainty, because the accurate position of the probe element in the space, and hence relative to the object being measured, is known at any time. Therefore, it is not necessary to perform path corrections by way of calculation for any defects occurring, such as straightness defects, length defects and tilt defects of three linear coordinate axes arranged at right angles to each other. Thanks to the integration of the device into a multi-coordinate measuring apparatus, not only static but also dynamic defects of geometry are considered. Serving as basis of the device of the invention is the first standard, which is configured as a planar standard with a line grating array including preferably at least one high-precision cross-ruled grating structure of a two-dimensional incremental measurement system. The main surface of the planar first standard may form a reference plane in the XY coordinate direction, for example. In this arrangement the line grating array serves as material measure in X and Y coordinate direction. The perpendicular on the main surface of the planar standard then defines the Z coordinate direction. Thus the planar standard forms the basis of the coordinate system in the multi-coordinate measuring apparatus. The two-dimensional movement of the second standard relative to the first standard is performed preferably with a cross slide for the X and the Y coordinate direction. The coordinate axis for the Z direction is provided on this cross slide.

Advantageous configurations of the device of the present invention are the subject matter of the subclaims.

If in one configuration of the device of the invention the line grating array of the first standard includes the two-dimensional line grating and a one-dimensional line grating, any redundancy in the line grating array that could incur additional cost is avoided.

If in another configuration of the device of the invention the first position measuring system includes at least one first reading head and spaced therefrom a second reading head for detecting the line grating array of the first standard, with the reading heads being provided on the second standard opposite the main surface of the first standard, the location and the angular position of the second standard in relation to the line grating array provided on the first standard can be detected with precise accuracy. To detect the position in the XY plane even one reading head would suffice. The use of two reading heads arranged at a defined, sufficiently large distance to each other affords the added possibility of detecting the angular position about the Z axis.

If in a further configuration of the device of the invention either both reading heads of the two reading heads of the first position measuring system are associated with the two-dimensional line grating of the first standard or one reading head is associated with a one-dimensional line grating while the other reading head is associated with the two-dimensional line grating, the position measuring system can be configured more or less elaborately, as appropriate, because a reading head associated with a one-dimensional line grating is less costly than a reading head associated with a two-dimensional line grating.

If in a further configuration of the device of the invention the first position measuring system includes three distance sensors arranged in the corners of an imaginary equilateral triangle on the second standard on a side opposite the first standard, it is possible to detect the distance and the angular position of the second standard with respect to the surface of the first standard. For this purpose, the distance sensors are spaced from each other by a defined, sufficiently large distance. Owing to this arrangement it is possible to determine the location and the spatial position of the second standard within the coordinate system defined by the first standard.

If in a further configuration of the device of the invention the second standard is provided on a column on which a carriage is movable along a guide, and extends parallel to the guide of the carriage, if the second standard is a prismatic body of preferably polygonal cross-section carrying two-dimensional line gratings on a first and a second surface, and if provision is made for a second position measuring system for determining the spatial position of a support member fixedly connectable with or integrated into the carriage with respect to the second standard, the second standard is integrable into a multi-coordinate measuring apparatus, whereby a low measurement uncertainty is achievable by non-contacting detection of the two-dimensional line gratings of the second standard, independently of the mechanical guiding quality of the carriage and the repeatability of the coordinate axis concerned. With this configuration of the device of the invention any errors such as straightness, length and tilt errors are detectable with high accuracy also in the vertical coordinate axis.

If in still another configuration of the device of the invention the second position measuring system comprises:
  a third reading head and, spaced therefrom, a fourth reading head, which are provided on the support member and associated with a first one of the two-dimensional line gratings of the second standard;
  a fifth reading head provided on the support member and associated with a second one of the two-dimensional line gratings of the second standard; and
  a fourth distance sensor for detecting the distance between the support member and one of the surfaces of the second standard provided with a two-dimensional line grating or any surface parallel thereto; and
  if the support member is arranged on the carriage in such manner that the support member is prevented from contacting the second standard during the detection operation, then a particularly low measurement uncertainty is achievable because geometric variations in the mechanical construction do not affect the measuring accuracy. The spatial position of a carriage movable in the vertical coordinate axis along a guide is detectable with precise accuracy. Since the second standard does not serve as guide for the second position measuring system, forces caused by contact and liable to corrupt the measurement result are avoided. Preferably, the second standard is decoupled from the multi-coordinate measuring apparatus in terms of forces, being hence maintained free from bearing and guiding loads. The measurement result obtained by the second position measuring system thus reflects at all times the actual position of the support member with respect to the second standard, regardless of whether or to which extent the guide of the carriage exhibits errors. Any path deviations of the carriage thus enter the measurement operation directly.

If in a further configuration of the device of the invention the first and the second surface are two opposed parallel lateral surfaces of the second standard, the second standard can be an elongate, ruler-type body of rectangular cross-section. The location and the spatial position of the support member and the carriage connected therewith with respect to the second standard are thus detectable in particularly simple manner.

If in another configuration of the device of the invention the first and the second surface of the second standard are, respectively, one lateral surface and one end surface arranged at an angle thereto, the support member can be of a construction which for particular applications may be more convenient than in the case of the preceding configuration of the device of the invention in which the two two-dimensional line gratings are arranged on two opposed, parallel lateral surfaces.

If in a further configuration of the device of the invention the fourth distance sensor is provided on the support member in a defined position with respect to its reading heads, it is in a position to determine its distance to one of the surfaces carrying the two-dimensional line gratings of the second standard in a direction at right angles to the coordinate axis. By virtue of the arrangement of the third, fourth and fifth reading head and the fourth distance sensor in accurately defined relative positions on the support member, the location and the spatial position of the support member and the carriage connected therewith can be determined repeatably.

If in still further configurations of the device of the invention the standards and the support member are made of a temperature-invariant material, effects of temperature on the measuring accuracy can be precluded.

If in a further configuration of the device of the invention the second standard is configured for arrangement between two spaced longitudinal guideways forming the guide for the carriage, the second standard is mountable on a column of the multi-coordinate measuring apparatus, which column is disposed longitudinally of the vertical coordinate axis, in such manner that variations in the dimensions or the position of the column and hence of the guide of the carriage are also detected on account of the applied type of pick-up of measured values. Known multi-coordinate measuring apparatus which would be suitable for use with at least this particular configuration of the device of the invention are the Klingelnberg P 65/P 100 gear measuring centers illustrated and described in the company's 2002 brochure No. 1353/D/IO so designated.

If in still another configuration of the device of the invention the second standard is an elongate rectangular plate, the plate may be dimensioned so as to enable it to be arranged between spaced longitudinal guideways of the carriage, level therewith or in a forwardly offset relationship thereto.

If in yet another configuration of the device of the invention the support member is U-shaped in cross-section and carries on its two U-shaped arms the third and fourth and, respectively, fifth reading head, it is particularly suitable for attachment to the carriage in such manner that the reading heads are capable of detecting the two-dimensional line gratings on two opposed, parallel surfaces of the second standard.

If in a further configuration of the device of the invention the support member is an angle bracket carrying on its two arms the third and fourth and, respectively, fifth reading head, the second position measuring system is particularly suitable for the detection of line gratings which the second standard carries on two surfaces arranged at an angle to one another.

If in still another configuration of the device of the invention the fifth reading head is provided on the support member in such manner that it lies opposite and level with the third or the fourth reading head with respect to a longitudinal dimension of the second standard, the two reading heads are capable of detecting their position in the direction of the vertical coordinate axis and in a direction at right angles thereto relative to opposite-mounted cross-ruled grating structures of the second standard. These three reading heads are jointly in a position to detect tilting of the support member about the vertical coordinate axis and about two further coordinate axes at right angles to the vertical coordinate axis.

If in a further configuration of the device of the invention the carriage carries a three-dimensional probe assembly provided with the probe element and with a third position measuring system, direct reference can be established between the probe element position and the carriage.

If in a further configuration of the device of the invention the probe assembly includes further reading heads connected to the support member directly by way of a cantilever-type holding element, direct reference can be established between the probe element position and the support member. Overall, therefore, the probe element position in the coordinate system defined by the first standard is determinable at all times.

If in yet another configuration of the device of the invention the holding element is made of a temperature-invariant material, the effect of temperature on the measurement accuracy can be precluded also at this point in the measurement chain.

BRIEF DESCRIPTION OF THE DRAWINGS

Embodiments of the present invention will be described in more detail in the following with reference to the accompanying drawings. In the drawings.

DETAILED DESCRIPTION OF THE PREFERRED EMBODIMENTS

Figure 1:
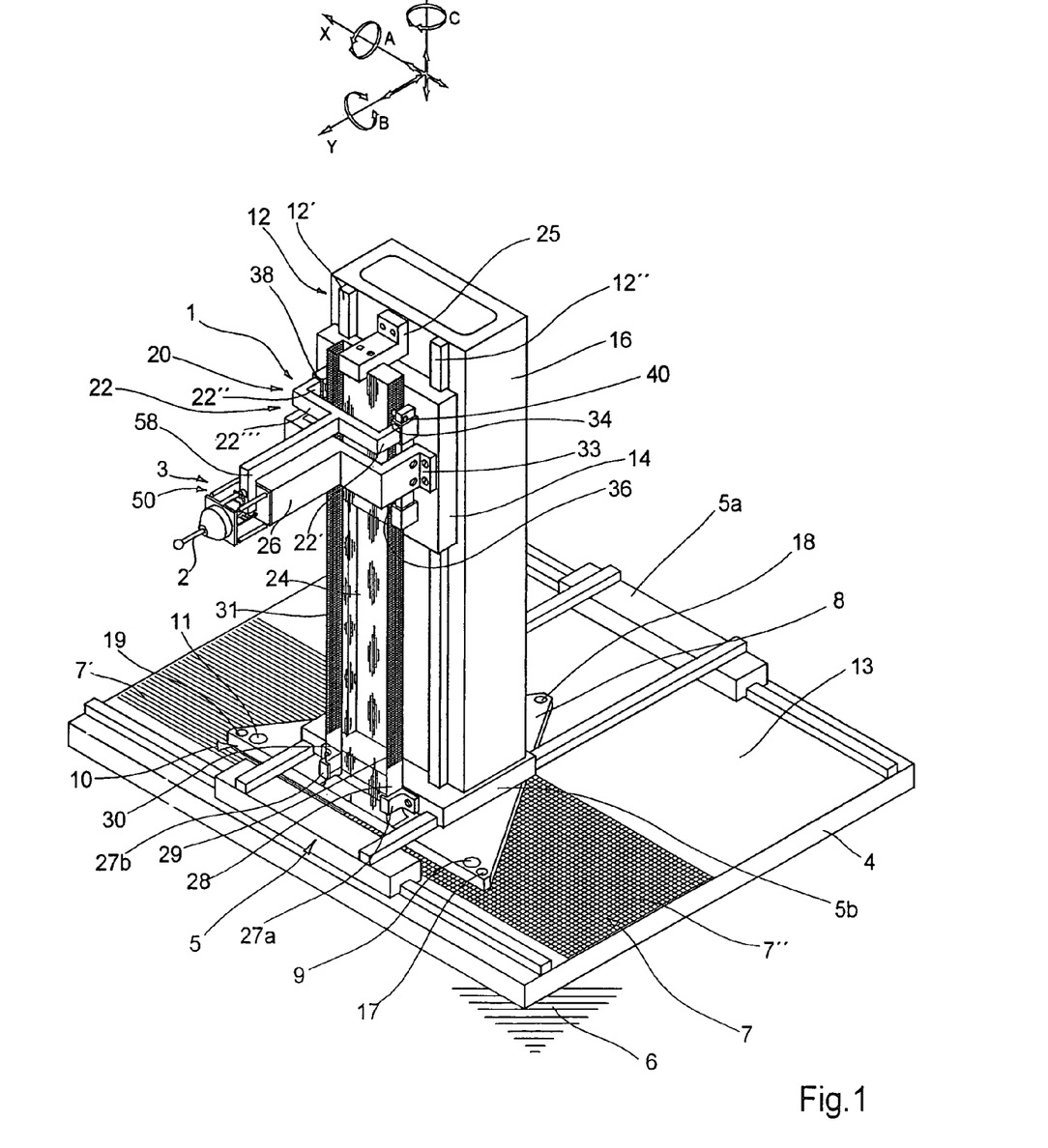
FIG. 1 is a perspective view of a first embodiment of a device of the present invention.

FIG. 1 shows a device, generally designated as 1, for direct detection of the spatial position of a probe element 2 in a multi-coordinate measuring apparatus of which only a Z column 16 and a three-dimensional probe assembly generally designated as 3 are shown. The Z column 16 is representative of the Z axis of a right-angled XYZ coordinate system illustrated at the top of FIG. 1. This illustration shows the six degrees of freedom of movement of a rigid body, that is, three translational degrees of freedom X, Y and Z and three rotary degrees of freedom A, B and C. The spatial position of a body is completely defined by the six degrees of freedom. The body whose spatial position is to be detected in the case herein described is as mentioned the probe element 2, which is part of the three-dimensional probe assembly 3 described in more detail further below. The aim is to detect any movements of the probe element 2 in X, Y and Z direction inclusive of all components of movement in the direction of the six degrees of freedom. The device 1 has a reference system, which in the embodiment illustrated in FIG. 1 is comprised of a first standard 4 and a second standard 24 that are associated with the X and Y axes and, respectively, the Z axis of the multi-coordinate measuring apparatus. The axes of the multi-coordinate measuring apparatus in the X and Y coordinate direction are realized as a cross slide generally designated as 5. The cross slide 5 includes an X slide 5a and a Y slide 5b. The X slide 5a is slidably guided on the first standard 4 in X direction, and the Y slide 5b is slidably guided on the X slide 5a in Y direction, as schematically shown in FIG. 1. The second standard 24 is thus movable two-dimensionally relative to the first standard 4 by means of the cross slide 5.

The first standard 4 is a planar standard with a main surface 13 on its upper side. In the embodiment shown it is constructed as a rectangular plate fastened to a bed 6 of a multi-coordinate measuring apparatus. The first standard 4 carries a two-dimensional line grating array 7 including a one-dimensional line grating 7' and a two-dimensional line grating 7". It will be understood that a two-dimensional line grating could be substituted for the one-dimensional line grating 7', in which event the line grating array 7 as a whole would be one two-dimensional line grating. This case is not shown in FIG. 1 for the sake of clarity of the illustration.

The Z column 16 is secured to the Y slide 5b of the cross slide 5 and carries, together with the Y slide 5b, the second standard 24 in such manner that it is arranged normal to the main surface 13 of the first standard 4 carrying the line grating array 7. When viewed in longitudinal section in a plane containing the Y and the Z axis, the second standard 24 is an L-shaped body having a triangular base 8 in top plan view, which is guided by the cross slide 5 parallel and in spaced relationship to the first standard 4.

The base 8 carries a first position measuring system generally designated as 10 for the non-contacting determination of the spatial position of the second standard 24 with respect to the first standard 4. The first position measuring system 10 includes a first incremental reading head 9 and a second incremental reading head 11 for detection of the two-dimensional line grating 7" and, respectively, the one-dimensional line grating 7' of the first standard 4, which reading heads are provided in spaced relation to each other on the base 8 of the second standard 24 on a side lying opposite the main surface 13 of the first standard 4. Furthermore, the first position measuring system 10 includes three distance sensors 17, 18 and 19 arranged in the corners of an imaginary equilateral triangle on the base 8 of the second standard 24 on the side lying opposite the main surface 13 of the first standard 4. Movement of the cross slide 5 causes movement of the distance sensors 17, 18 and 19 in the XY plane parallel to the first standard 4 and spaced therefrom by a small distance. The three distance sensors 17, 18 and 19 operate to detect the distance and the angular position of the second standard 24 with respect to the main surface 13 of the first standard 4. The two reading heads 9 and 11 operate to detect the location and the angular position of the second standard 24 in the XY plane with respect to the line grating array 7 mounted on the first standard 4. In the representation of FIG. 1 the reading head 9 of the two reading heads 9, 11 of the first position measuring system 10 is associated with the two-dimensional line grating 7", while the reading head 11 is associated with the one-dimensional line grating 7'. It will be understood, however, that the arrangement may also be such that both reading heads 9, 11 are associated with the two-dimensional line grating 7". In such an arrangement, not shown in FIG. 1, it would be necessary for the two-dimensional line grating 7" to be extended in its surface area to ensure that the disposition of the reading heads 9, 11 above the two-dimensional line grating 7" is maintained over the entire range of movement of the cross slide 5. For this purpose, it would also be possible to substitute simply a further two-dimensional line grating for the one-dimensional line grating 7', which, as mentioned, is likewise not shown for the sake of clarity of the illustration.

The Z column 16 is a rigid, torsion-resistant, elongate hollow structure. Movable on the Z column 16 is a carriage 14 along a guide generally designated as 12. The guide 12 of the carriage 14 is formed by two longitudinal guideways 12', 12" spaced from each other in a direction transverse to the Z axis. The carriage 14 has two parallel longitudinal grooves receiving the longitudinal guideways 12', 12" slidably therein, and it carries the three-dimensional probe assembly 3.

To detect the spatial position of the probe element 2 it is necessary to detect the spatial position of the carriage 14. In this context, detection of the spatial position of the carriage 14 means that it shall not only include the detection of the primary movement in the Z coordinate direction but also any other minor movements, caused by guide errors, in the direction of the total of six degrees of freedom of a rigid body in the space. To accomplish this, a second position measuring system generally designated as 20 is used. With this system the spatial position of a support member 22 fixedly connected to the carriage 14 by means of a U-section member 33 relative to the second standard 24 is determinable. The second standard 24 extends parallel to the guide 12 of the carriage 14 and is of a polygonal cross-section, in the embodiment shown of a rectangular cross-section. The second standard 24 is arranged parallel to the Z axis and parallel to the carriage 14 at fixed distances to the Z column 16 and the carriage 14. In the embodiment shown, the second standard 24 is an elongate rectangular plate having its upper part fixedly connected to the Z column 16 by means of an angle bracket 25, while its lower part is slidably connected to the Y slide 5b by two angle brackets 27a, 27b. The Y slide 5b in turn is rigidly connected to the Z column 16. Similar to the first standard 4, the second standard 24 is made of a temperature-invariant material to prevent the possibility of temperature effects on the detection of the spatial position of the carriage 14 and hence of the probe element 2. The angle bracket 25, the U-section member 33 and the angle brackets 27a, 27b herein defined as fixed and, respectively, movable connections are shown merely for purposes of illustration and in practice may be made of totally different, yet equivalent means.

The second standard 24 carries on a first surface, herein a lateral surface 28, and on a second surface, herein a lateral surface 30, a two-dimensional line grating 29 and 31, respectively. Hence, the first and the second surface are the two opposed, parallel lateral surfaces on the longitudinal outer sides of the elongate rectangular plate constituting the second standard 24.

To detect the line gratings 29, 31 of the second standard 24, the second position measuring system 20 comprises:

a third reading head 34 and, under it and vertically spaced therefrom, a fourth reading head 36, both of which are provided on the support member 22 and associated with the line grating 29;

a fifth reading head 38 provided on the support member 22 and associated with the line grating 31; and a fourth distance sensor 40 for detecting the distance between the support member 22 and the lateral surface 28 provided with the line grating 29 or any other surface of the second standard 24 parallel thereto.

The support member 22 is arranged on the carriage 14 in such manner that neither the support member nor the reading heads 34, 36, 38 nor the distance sensor 40 are able to contact the second standard 24 at any point. Preferably, the fifth reading head 38 is provided on the support member 22 so as to be opposite and level with the third reading head 34 with respect to the longitudinal dimension of the second standard 24. The fourth reading head 36 is arranged in a vertically spaced relationship under the third reading head 34 so that the three reading heads 34, 36, 38 lie in a plane, containing the Z axis, of a longitudinal section through the second standard 24 in the corners of a right triangle. With respect thereto, the fourth distance sensor 40 is provided in a defined position on the support body 22, that is, as close as possible to the third reading head 34. The support member 22 is U-shaped in cross-section (that is, in a direction transverse to the Z axis), carrying on its two U legs 22', 22" the third and the fifth reading head 34 and 38, respectively. In this arrangement the U leg 22' is extended vertically downwardly so that the fourth reading head 36 is sufficiently spaced from the third reading head 34 for an accurate measurement. Similar to the two reading heads 9 and 11, the three reading heads 34, 36, 38 are incremental optical reading heads. The fourth distance sensor 40 is preferably a capacitive sensor, but it will be understood that an inductive or optical sensor may also be contemplated. The two-dimensional line gratings 29, 31 are cross-ruled grating structures. The second standard 24 is preferably a glass body (Zerodur®), but could also be a body made of Invar® steel, which, while being temperature-invariant, is not equally well suited, like glass, to the application of cross-ruled grating structures.

In the embodiment illustrated in FIG. 1 the support member 22 is fastened to the front side of the carriage 14 and is made of a temperature-invariant material. Instead, the support member 22 could also be an integral part of the carriage 14.

Figure 2:
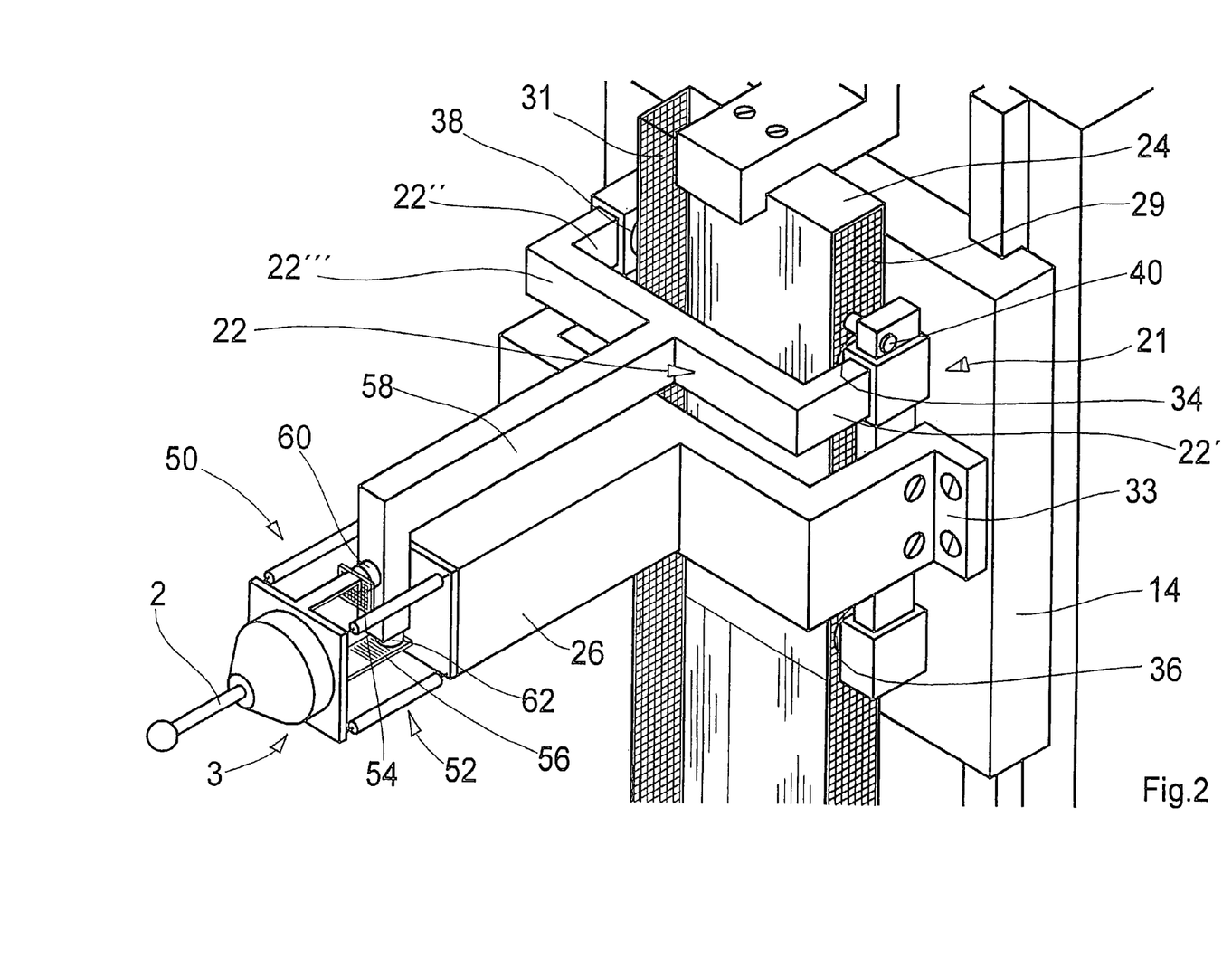
FIG. 2 is a view, on an enlarged scale, of a detail of the device of FIG. 1.

The three-dimensional probe assembly 3 includes a third position measuring system, generally designated as 50, which in the enlarged representation of FIG. 2 can be seen in better detail than in FIG. 1. The U-section member 33 is extended to form a cantilever arm 26 towards the probe assembly 3. The third position measuring system 50 is movably mounted on the cantilever arm 26 by means of a parallelogram linkage generally designated as 52. The probe element 2 carries on its side adjacent to the second standard 24 a two-dimensional line grating 54 and a one-dimensional line grating 56. A U web 22''' of the support member 22 is forwardly extended towards the probe assembly 3 by a cantilever-type holding element 58 having mounted on its free end two incremental optical reading heads 60, 62, which are associated with the two-dimensional line grating 54 and the one-dimensional line grating 56, respectively. The reading heads 60, 62 thus integrated into the probe assembly 3 are directly connected to the support member 22 via the holding element 58. This enables a direct reference to be established between the probe element position 2 and the support member 22. Overall, therefore, the probe element position in the coordinate system defined by the first standard 4 is determinable at all times with precise accuracy. The U-section member 33 and hence the cantilever arm 26 as well as the holding element 58 are equally made of a temperature-invariant material.

The device 1 illustrated in FIGS. 1 and 2 operates as follows:

By means of the cross slide 5, the second standard 24 is moved with its base 8 over the first standard 4 without touching the latter. The reading heads 9 and 11 detect their position in X and Y directions relative to the opposite line gratings 7" and 7', respectively, of the first standard 4. The distance sensors 17, 18, 19 detect their distance in the Z direction relative to the main surface 13 of the first standard 4. This construction affords the possibility of determining the location and the spatial position of the second standard 24 within the coordinate system defined by the first standard 4.

In vertical direction it is by means of the carriage 14 of the Z axis that the support member 22 is guided along the second standard 24 without touching the latter. The reading heads 34 and 38 detect their position in Z and Y direction relative to the opposite line gratings 29 and 31, respectively, of the second standard 24. The fourth reading head 36 detects only its position in Y direction relative to the line grating 29 provided on the lateral surface 38 of the second standard 24. The fourth distance sensor 40 detects a distance in the X direction relative to the lateral surface 28 on the right-hand side of the second standard 24. Thanks to the arrangement of the three reading heads 34, 36, 38 and the fourth distance sensor 40 in defined positions relative to the reading heads on the support member 22, the location and the spatial position of the support member 22 and the carriage 14 connected therewith relative to the second standard 24 can be determined, that is, the total of six translational and rotary components X, Y and Z and A, B and C, respectively, of the movement of the support member 22 and hence of the carriage 14.

Because the reading heads 60, 62 of the three-dimensional probe assembly 3 are connected to the support member 22 by means of the holding element 58, direct reference between the probe element position and the support member 22 can be established through the line gratings 54, 56. Overall, therefore, the probe element position in the coordinate system defined by the first standard 4 is determinable at all times with precise accuracy.

Figure 3:
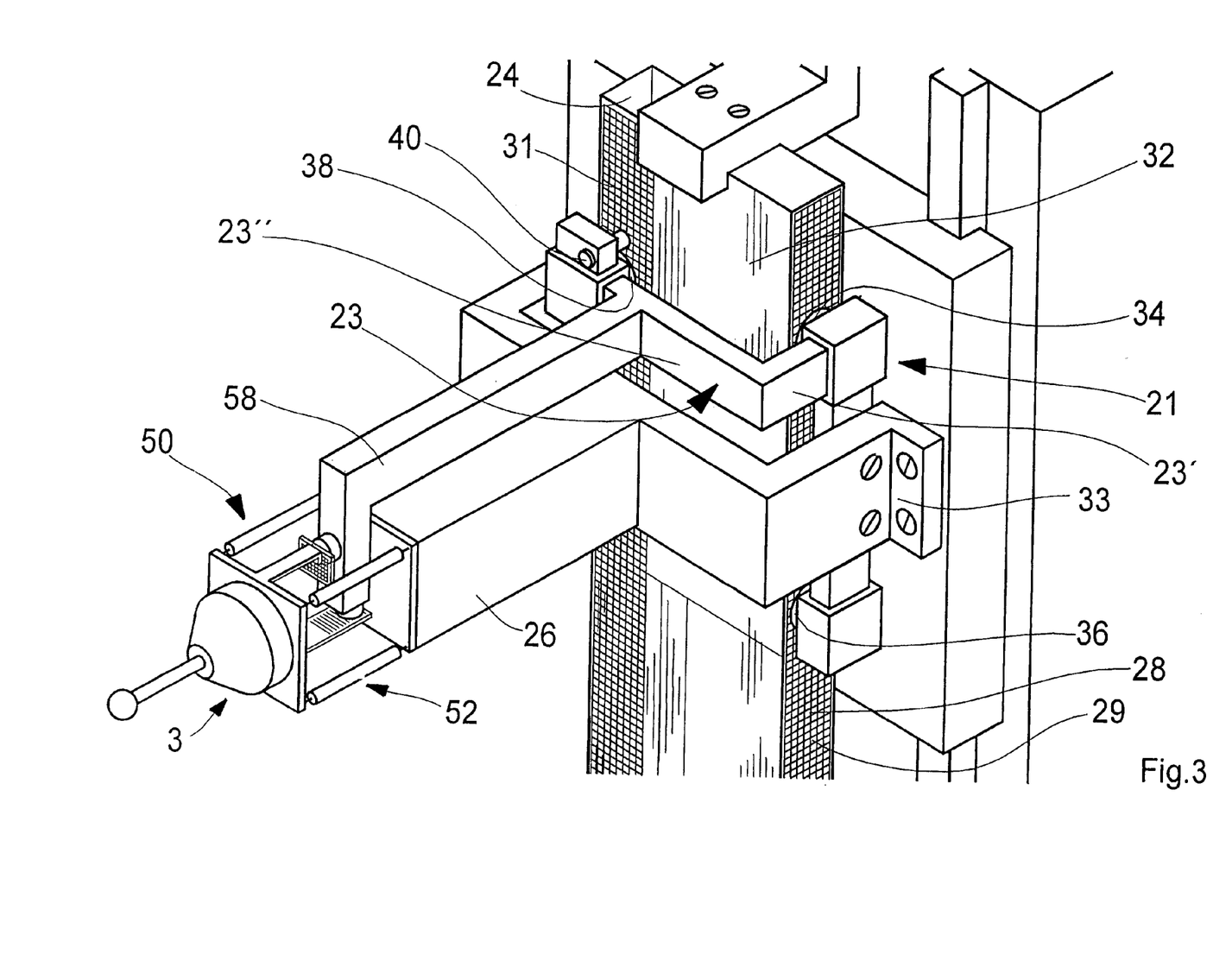
FIG. 3 is a view, on an enlarged scale, of a detail of a second embodiment of the device of the invention with an alternative second position measuring system.

FIG. 3 shows, on an enlarged scale, a detail of a second embodiment of the device, generally designated as 1, with an alternative second position measuring system 21. In this embodiment the first and the second surface on which the second standard 24 carries the two-dimensional line gratings 29 and 31, respectively, are the lateral surface 28 and, respectively, an end surface 32 extending at an angle thereto. The fifth reading head 38 is associated with the line grating 31 of the third surface 32. Provided on a support member 23 adjacent to the fifth reading head 38 is the fourth distance sensor 40, said support member being an angle bracket carrying on its two angle arms 23', 23" the third reading head 34 and under it the fourth reading head 36 and, respectively, the fifth reading head 38. Apart from the afore-described difference in construction of the second position measuring system 21 to that of the second position measuring system 20, the device has the same construction and the same mode of operation as the device 1 of FIGS. 1 and 2 and, therefore, does not need to be described again.

What is claimed is:

1. A device for detecting a spatial position of a probe element in a multi-coordinate measuring apparatus, comprising:
    a reference system having at least one first and one second standard that are associated with coordinate axes of the measuring apparatus, the first standard being a planar standard having a main surface carrying a line grating array which includes at least one two-dimensional line grating, and the second standard being movable in two dimensions and non-contacting relative to the first standard, said second standard comprising an elongate prismatic body carrying two-dimensional line gratings on a first and a second surface thereof, and wherein the second standard is provided on a column on which a carriage is movable along a guide, and extends parallel to the guide of the carriage;
    a first position measuring system for determining the spatial position of the second standard with respect to the first standard; and
    a second position measuring system for determining the spatial position of a support member fixedly connectable with or integrated into the carriage with respect to the second standard.

2. The device as claimed in claim 1, wherein:
    the first position measuring system includes at least one first reading head and spaced therefrom a second reading head for detecting the line grating array of the first standard, said reading heads being provided on the second standard opposite the main surface of the first standard; and
    the second position measuring system comprises:
    a third reading head and, spaced therefrom, a fourth reading head, which are provided on the support member and associated with a first one of the two-dimensional line gratings of the second standard,
    a fifth reading heart provided on the support member and associated with a second one of the two-dimensional line gratings of the second standard, and
    a distance sensor for detecting the distance between the support member and one of the surfaces of the second standard provided with a two-dimensional line grating or any surface parallel thereto,
    wherein the support member is arranged on the carriage in such manner that the support member is prevented from contacting the second standard during the detection operation.

3. The device as claimed in claim 2, wherein the first and the second surface are two opposed parallel lateral surfaces of the second standard.

4. The device as claimed in claim 2, wherein the first and the second surface of the second standard are, respectively, one lateral surface and one end surface arranged at an angle thereto.

5. The device as claimed in claim 2, wherein the distance sensor is provided on the support member in a defined position with respect to its reading heads.

6. The device as claimed in claim 2, wherein the standards are made of a temperature-invariant material.

7. The device as claimed in claim 2, wherein the support member is made of a temperature-invariant material.

8. The device as claimed in claim 2, wherein the second standard is configured for arrangement between two spaced longitudinal guideways forming the guide for the carriage.

9. The device as claimed in claim 2, wherein the second standard is an elongate rectangular plate.

10. The device as claimed in claim 2, wherein the support member is U-shaped in cross-section and carries on its two U-shaped arms the third and fourth and, respectively, fifth reading head.

11. The device as claimed in claim 2, wherein the support member is an angle bracket carrying on its two angle arms the third and fourth and, respectively, fifth reading head.

12. The device as claimed in claim 2, wherein the fifth reading head is provided on the support member in such manner that it lies opposite and level with the third or the fourth reading head with respect to a longitudinal dimension of the second standard.

13. The device as claimed in claim 1, wherein the carriage carries a three-dimensional probe assembly provided with the probe element and with a third position measuring system.

14. The device as claimed in claim 13, wherein the probe assembly includes further reading heads connected to the support member directly by way of a cantilever-type holding element.

15. The device as claimed in claim 14, wherein the holding element is made of a temperature-invariant material.

* * * * *

UNITED STATES PATENT AND TRADEMARK OFFICE
CERTIFICATE OF CORRECTION

| | | |
|---|---|---|
| PATENT NO. | : 7,114,265 B2 | Page 1 of 1 |
| APPLICATION NO. | : 10/802212 | |
| DATED | : October 3, 2006 | |
| INVENTOR(S) | : Georg Mies | |

It is certified that error appears in the above-identified patent and that said Letters Patent is hereby corrected as shown below:

Claim 2, column 11, line 39, please delete the word "heart" and replace it with the word --head--.

Signed and Sealed this

Ninth Day of January, 2007

JON W. DUDAS
*Director of the United States Patent and Trademark Office*